(12) United States Patent
Panchal (10) Patent No.: US 9,222,924 B1
(45) Date of Patent: Dec. 29, 2015

(54) DIFFERENTIAL KINETIC TEST UNIT

(71) Applicant: E3TEC SERVICE, LLC, Clarksville, MD (US)

(72) Inventor: Chandrakant B. Panchal, Clarksville, MD (US)

(73) Assignee: E3TEC Service, LLC, Clarksville, MD (US)

( * ) Notice: Subject to any disclaimer, the term of this patent is extended or adjusted under 35 U.S.C. 154(b) by 0 days.

(21) Appl. No.: 14/319,086

(22) Filed: Jun. 30, 2014

Related U.S. Application Data (60) Provisional application No. 61/958,516, filed on Jul. 30, 2013.

(51) Int. Cl.
*G01N 31/10* (2006.01)
*B01J 19/18* (2006.01)
*B01J 8/02* (2006.01)
*B01J 8/00* (2006.01)

(52) U.S. Cl.
CPC .............. *G01N 31/10* (2013.01); *B01J 8/008* (2013.01); *B01J 8/025* (2013.01); *B01J 19/1875* (2013.01); *B01J 2208/00876* (2013.01)

(58) Field of Classification Search
CPC ............................ B01J 19/1875; G01N 31/10
See application file for complete search history.

(56) References Cited

U.S. PATENT DOCUMENTS

| | | | |
|---|---|---|---|
| 5,234,883 A * | 8/1993 | Schaefer-Sindlinger et al. | 502/339 |
| 6,062,069 A | 5/2000 | Panchal | |
| 6,086,832 A * | 7/2000 | Ohta | 422/211 |
| 7,074,962 B2 * | 7/2006 | Machado et al. | 564/397 |
| 7,279,145 B2 * | 10/2007 | Balan | 422/239 |
| 7,547,135 B2 * | 6/2009 | Kocienski | 366/273 |

* cited by examiner

*Primary Examiner* — Lessanework Seifu
(74) *Attorney, Agent, or Firm* — Rosenberg, Klein & Lee (57) ABSTRACT

A differential kinetic test unit tests chemical reaction parameters. Reaction media is inserted into a vessel through a reactant feed conduit. A reaction outlet mechanism removes liquid and vapor reaction components from the vessel. A motor rotates a reaction shaft which extends into the reaction media within the vessel. A mixing impeller is fixed to the reaction shaft and is positioned within the reaction media. A catalyst frame positions a catalyst container holding a catalyst with the catalyst container being immersed in the reaction media. Reaction media is drawn through the catalyst and the reacted media is passed through the reaction outlet mechanism for testing of the chemical reaction parameters.

29 Claims, 8 Drawing Sheets

DIFFERENTIAL KINETIC TEST UNIT

REFERENCE TO RELATED PATENT APPLICATIONS

This Patent Application is based upon Provisional Patent Application Ser. No. 61/958,516 filed at the U.S. Patent and Trademark Office on 30 Jul. 2013.

FIELD OF THE INVENTION

This invention relates to application of batch kinetic parameters of catalytic chemical reactions to single-phase as well as two-phase flow reactors that are typical of reactive distillation processes for manufacture of industrial chemicals.

Further, the subject concept is directed to conducting catalytic reaction tests in a prototype environment for scaling batch kinetic parameters to single-phase and two-phase flow reactors.

BACKGROUND OF THE INVENTION

Batch kinetic experiments have been carried out using a stirred reactor in which catalyst particles move freely within the reactive liquid media. The rate of reaction as a function of time is then generally monitored by taking liquids and/or gas samples and doing an analysis using gas chromatography (GC), mass spectrometer through a mass-spectrometer or some other analytic methods. The subject concept focuses on a kinetic test unit in which process conditions may be closely simulated in order to reduce the uncertainty associated with scaling laboratory test data to a conventional reactive distillation column, reaction distillation with side reactors, and conventional plug-flow reactors. This can be validated using a pilot plant and the kinetic test unit may bypass needs for industrial-scale pilot plant tests by applying the data, with appropriate design tools to commercial units.

PRIOR ART

The closest prior art known to Applicant is U.S. Pat. No. 6,062,069 entitled "High Temperature Fouling Test Unit". This prior art is a basis upon which the subject system has been developed. Such prior art is directed to a high temperature fouling test unit having a flow tube with a fouling probe received within the flow tube. An annular passage is defined between the fouling probe and the flow tube with an impeller mounted within the flow tube for inducing fluid flow within the annular passage.

However, the prior art Patent relates to an apparatus for simulating industrial fouling or corrosive conditions in process equipment such as heat exchangers. More particularly, it relates to a high temperature fouling test unit in which flow and temperature conditions are produced in a short section of tube for measuring the fouling or corrosive effects on tubing.

However, this prior art is directed to a fouling system configuration and does not provide for any catalyst frame to position the catalyst container containing a catalyst within the system. Such prior art does not provide for the catalyst container being immersed in a reaction media with the reaction media being drawn through the catalyst whereby the reacted media is drawn through a reaction outlet mechanism for test of chemical reaction parameters, as is necessary to the subject system.

In general, batch kinetic experiments currently are carried out using a stirred reactor in which catalyst particles are permitted to be displaced freely within the reactive liquid medium. The rate of reaction as a function of time is then monitored by taking liquid and/or gas samples and using analytic methods for analysis.

A problem with this prior art approach is that the fluid dynamics associated with catalysts loading in side reactors of a reactive distillation and structured packed columns where the porosity and catalyst effectiveness cannot be simulated. Thus, in such prior art systems, the kinetic parameters obtained with batch experiments cannot be used directly to predict the performance of flow reactors with heterogeneous catalysts.

In such prior art, an adjusting parameter of the catalyst effectiveness may be arbitrarily used for validating the performance prediction models or simulation codes using test data from a pilot-scale reactive distillation. Thus, there is an unknown uncertainty which requires relatively expensive industrial pilot-plant tests.

In order to provide expanded applications of reactive distillation to achieve potential benefits of energy efficiency and lower capital costs, it has been a long-standing need to develop innovation design methods.

SUMMARY OF THE INVENTION

A differential kinetic test unit for testing chemical reaction parameters is provided. The differential kinetic test unit (DKTU) includes a vessel for insert of reaction media through a reactant feed conduit. A reaction outlet mechanism removes liquid and vapor reaction components. A motor is positioned external the vessel to rotate a motor shaft and a reaction shaft which extends into the reaction media contained within the vessel. A mixing impeller is fixed to the reaction shaft with the mixing impeller located within the reaction media. A catalyst frame positions a catalyst container which contains a catalyst and the catalyst container is immersed in the reaction media. The reaction media is drawn through the catalyst whereby reacted media is withdrawn through the reaction outlet mechanism for testing of the chemical reaction parameters.

An object of the subject concept is to obtain kinetic parameters in an environment of conventional reactive distillation where catalysts are loaded in the distillation column either in a packed manner or a tray type.

A further object of the subject invention is to obtain kinetic parameters in an environment of a plug-flow catalyst reactor used as a side reactor of the reaction distillation.

A still further object of the subject system is to determine catalyst inhibitions in a prototype environment and develop an effective in-situ method for reactivation.

A still further object of the subject system is to optimize the packaging of catalyst container bags with structured packing. A further object of the subject concept is to develop mechanisms for promoting increased surface-tension driven liquid flow within catalyst container bags for high catalyst wetting resulting in a highly efficient and effective system.

Still further, the subject concept obtains kinetic parameters under prototype single-phase and two-phase flow catalytic reactors as well as reactive distillation processes.

DESCRIPTION OF THE PREFERRED EMBODIMENTS

Figure 1:
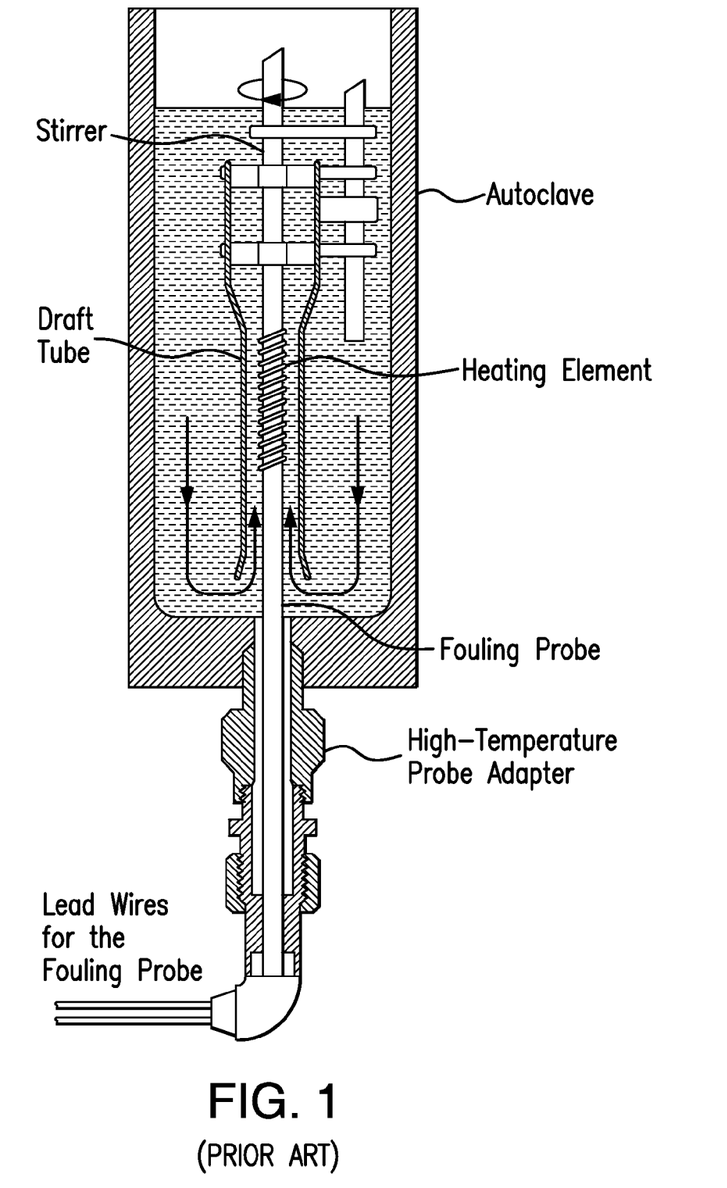
FIG. 1 is a schematic view of a conventional high temperature fouling test unit of which the subject system is an improvement.
Figure 2:
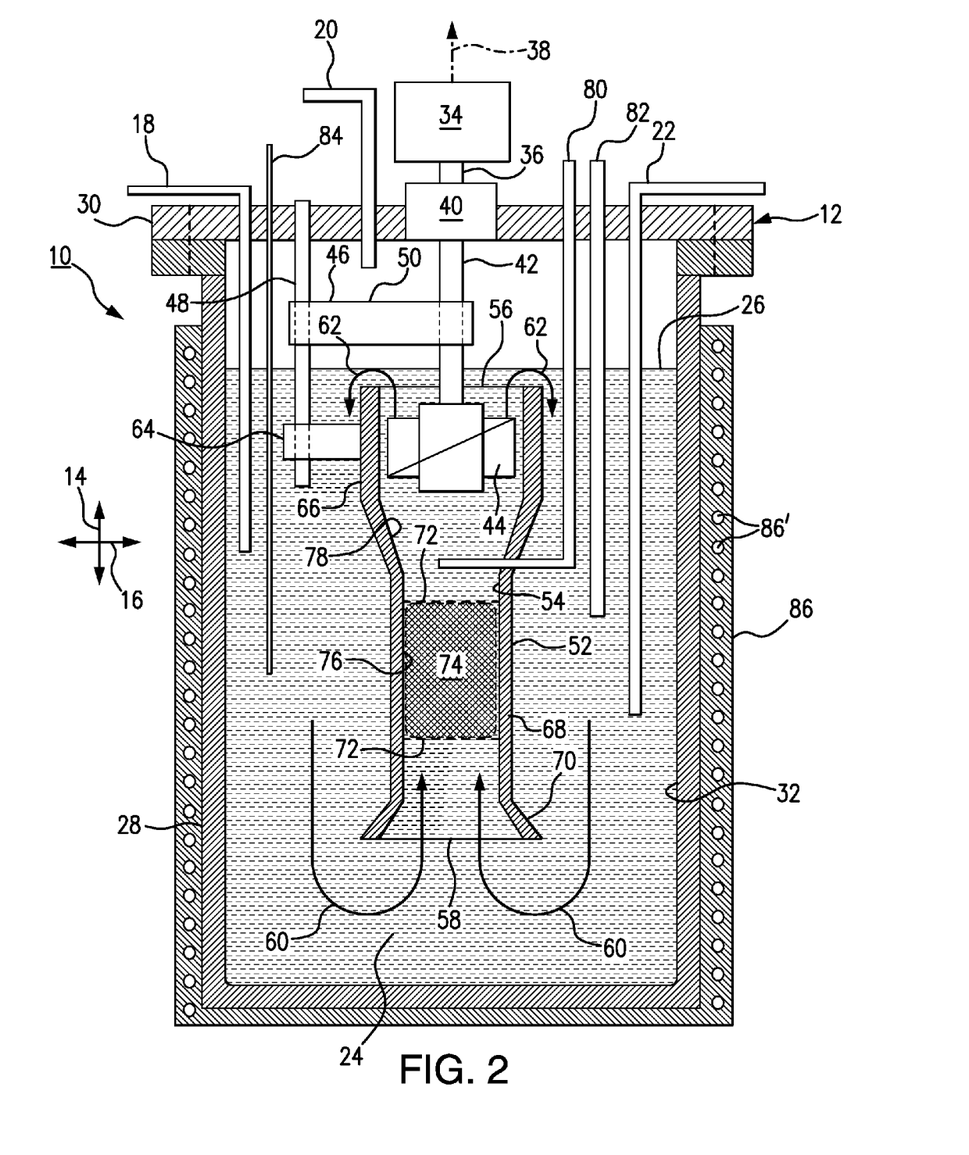
FIG. 2 is a schematic view of a first embodiment of the subject system which includes a flow tube and a catalyst container, containing the catalyst within the flow tube.

Referring now to FIG. 2, there is shown differential kinetic test unit (DKTU) for conducting reaction kinetic tests in a prototype environment to apply laboratory kinetic parameters to single-phase and two-phase flow reactors as well as to reactive distillation.

Differential kinetic test unit 10 includes a containing vessel or autoclave 12 for maintaining reactant media 24 therein during operation. Vessel 12 provides for a sealed enclosure which includes vessel 12 sidewalls 28 in sealed engagement with upper vessel wall 30 to provide a sealed environment for media 24 going through a reaction phase. In this manner, reactant media 24 is maintained within a closed environment for operation as will be detailed in following paragraphs.

Reactant feed is inserted into vessel chamber 32 through reactant feed conduit 22 as seen in FIG. 2. Reactant feed conduit 22 permits reactant media 24 to at least partially fill vessel chamber 32. A standard or variable speed electrical motor 34 drives motor shaft 36 about shaft axis 38 and through gear reduction mechanism 40 which is magnetically coupled to reaction shaft 42. Electrical motor 34 is seen mounted external to vessel 12 and through the magnetically coupled gear reduction box 40, electrical motor 34 drives reaction shaft 42 about reduced rotational speed with respect to motor shaft 36. Reaction shaft 42 is secured to mixing impeller 44. Mixing impeller 44 is fixed to reaction shaft 42 and is positionally located within reactant media 24 below the reactant media upper surface 26. Thus, impeller 44 is immersed within reactant media 24 within vessel 12, as is seen in FIG. 2. Rotation of mixing impeller 44 results in a pressure drop through the vertical distance as indicated by vertical arrows 14, between a lower portion 70 of vessel 12 and an upper section 66 thereof.

Mixing impeller 44 is maintained in fixed alignment within vessel 12 through thermal well or first support member 48 which is secured in a fixed manner to vessel upper wall 30, as seen in FIG. 2. Thermal wall or first support member 48 is attached to horizontally directed second support member 50 which extends in a horizontal direction 16 and is secured on one end to first support member 48 and is mounted around reaction shaft 42 on a second end thereof. Reaction shaft 42 is rotationally actuated about shaft axis 38 within a through opening formed in second support member 50 which allows maintenance of reaction shaft 42 in a relatively stable position, however, such permits rotation of reaction shaft 42 and responsively mixing impeller 44.

In the preferred embodiment shown in FIG. 2, DKTU 10 includes flow tube 52 defining a flow tube vertically directed channel 54 extending in vertical direction 14 throughout the length of flow tube 52. Flow tube 52 is at least partially immersed within reactant media 24 and through the rotation of mixing impeller 44 about shaft axis 38, a pressure drop is provided between flow tube exit section 56 and flow tube input section 58. Responsive to rotation of mixing impeller 44, reactant media is drawn internal to flow tube vertically directed channel 54 as depicted by the directional arrows 60. Similarly, upon rotation of mixing impeller 44, media is drawn through flow tube 52 and exits flow tube 52 in the direction as depicted by the directional arrows 62.

In order to maintain stabilization of flow tube 52 within vessel 12, outer wall of flow tube 52 is fixed to flow tube support member 64 which in turn is fixedly attached to thermal well or first support member 48, as shown.

Flow tube 52 includes upper section 66 having mixing impeller 44 mounted therein. Additionally, flow tube 52 includes central section 68 and lower section 70 for ingress of media 24. Central section 68 of flow tube 52 provides for an area where catalyst frame 72 may be mounted, as will be detailed in following paragraphs. Catalyst frame 72 has a catalyst 74 for reaction purposes. Lower flow tube lower section 70 serves as the ingress at the flow tube input section 58 of the reactant media 24.

Catalyst frame 72 may be mounted within flow tube central section 68 in a fixed manner but releasable therefrom for insertion of different catalysts 74. Catalyst frame 72 positions a catalyst container 76 containing the catalyst 74. Catalyst container 76 is seen to be at least partially immersed in reaction media 24 within vessel 12. In this manner, reaction media 24 is drawn through the catalyst 74 responsive to the rotation of mixing impeller 44. Reacted media may then be withdrawn through reaction outlet mechanisms defined by liquid reaction media outlet conduit 18 and vapor reaction media outlet conduit 20 for testing of chemical reaction parameters.

In the embodiment shown in FIG. 2, the catalyst frame 72 may be a porous wire structure which allows flow of reactant media 24 therethrough. Such porous wire framing is secured to an internal wall 78 of flow tube 52. Catalyst container 76 containing catalyst 74 may be a wire mesh bag, or some like structure not important to the subject concept with the exception that it provide a container for catalyst 74 while maintaining the ability to provide flow of reactant media 24 through catalyst 74 responsive to rotation of mixing impeller 44.

Flow tube 52 as seen can take the general contour of a Venturi type tube having flow tube lower section 70 with a cross-sectional area greater than the cross-sectional area of flow tube central section 68. Flow tube upper section 66 similarly has a cross-sectional area greater than the cross-sectional area of flow tube central section 68 to provide an increased velocity flow rate of media 24. In certain embodiments, where, for example, lower flow velocity is required, the cross-section of the middle catalyst section may be larger than the top impeller section.

The particular sizing and the cross-sectional areas of flow tube section 70, 68, and 66 may be varied dependent upon parameters being tested and a particular testing criteria associated with different reactant media 24.

Catalyst container 76 is mounted within flow tube 52, as seen. Catalysts 74 are supported by the perforated screen or catalyst frame 72. The catalyst bag or container 76 is mounted within flow tube central section 68. Through adjustment of relative sizes of the flow tube lower section 70, flow tube central section 68, and flow tube upper section 66, a wide range of flow velocities may be obtained dependent upon the desired parameters being tested. The mixing impeller 44 is, as previously described, coupled to reaction shaft 42 which in turn is attached to variable speed motor 34 through the magnetic coupling device 40 which produces flow in a vertical direction 14 within flow tube 52 and responsively through catalyst 74.

In order to test parameters of the reacted media, the reaction outlet mechanism consisting of the liquid reaction media outlet conduit 18 and vapor reaction media outlet conduit 20 is provided. Liquid reaction media outlet conduit 18 removes liquid reaction components from internal vessel 12 with the liquid outlet conduit 18 extending from exterior of the vessel 12 to a position below reactant media surface 26 of the reactant media 24 contained within vessel 12. Vapor reaction media outlet conduit 20 removes vapor reaction components from internal vessel 12. The vapor outlet conduit 20 extends from exterior of the vessel 12 to a position above upper surface 26 of the reaction media 24 contained within the vessel 12.

Additionally, there is provided flow tube liquid sampling conduit 80 passing external vessel 12 through flow tube internal wall 78 for sampling reactant media subsequent to passage through catalyst 74. Additionally, liquid media sampling conduit 82 extending from external vessel 12 may pass below upper surface 26 of reactant media 24 for sampling reactant media contained within vessel 12. A thermal sensor 84 extends from external vessel 12 into reactant media 24 for sensing temperature conditions within reactant media 24 responsive to heating of the reactant media 24. A thermal jacket 86 surrounds at least a portion of the exterior walls of vessel 12 and may be of any well-known commercially available thermal jacket including electrical heating wires 86' contained therein for heating of the reactant media 24.

Thermal sensor 84, and thermal jacket 86 are commercially available and may be one of many known types.

As represented in FIG. 2, a DKTU 10 may represent a prototype catalytic reaction condition of reactive distillation processes in which a structured catalyst packing, for example, Sulzer Katapak™ is installed in the distillation column represented by flow tube 52. In this configuration, catalyst container 76, and catalyst frame 72 is replaced by the structured catalyst packing containing catalyst 74. The structured catalyst packing is mounted within flow tube 52 and may be supported by a perforated screen or porous media. The catalyst bag may be instrumented for measurement of localized temperatures within the packed catalyst, as is desired.

Figure 3:
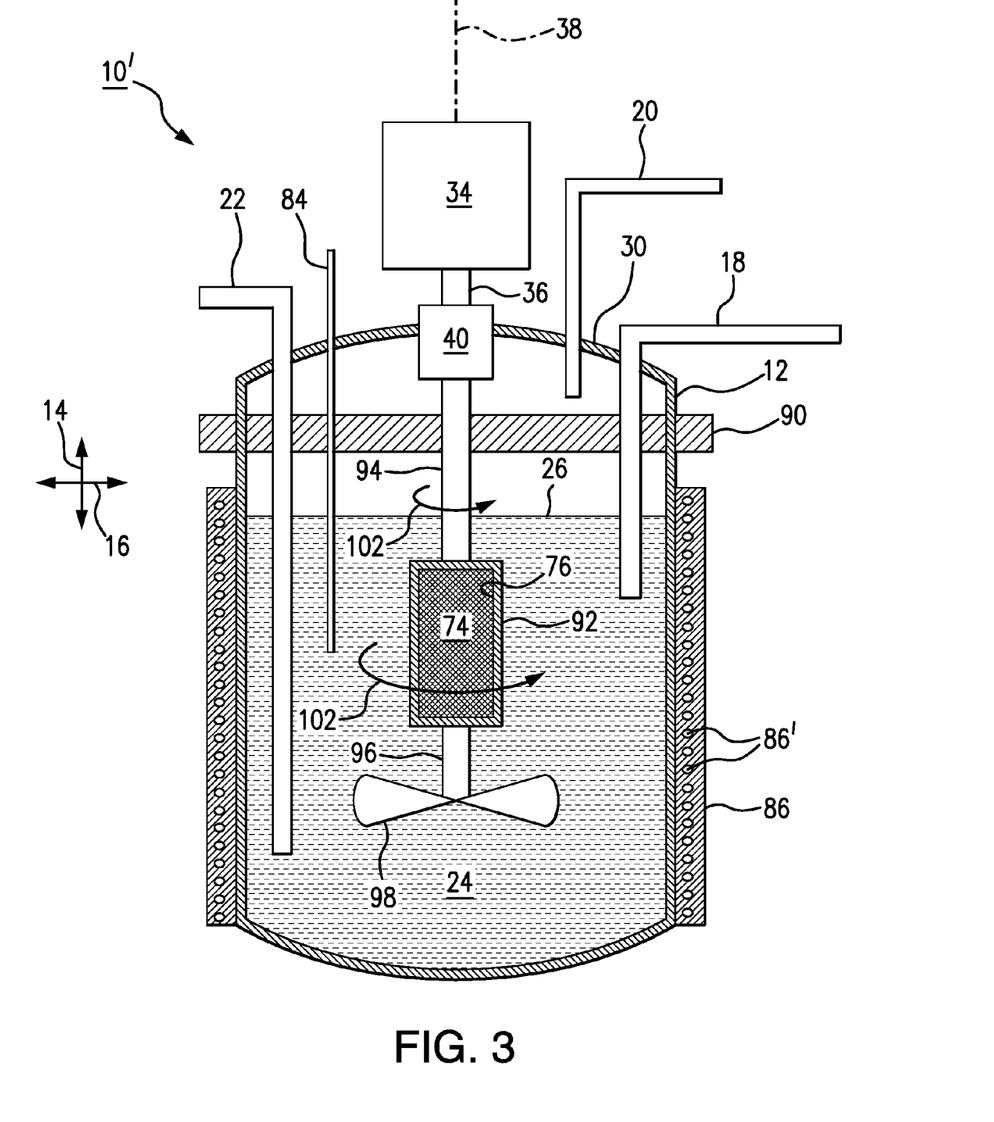
FIG. 3 is a schematic view of a second embodiment of the subject system which includes a mixing impeller positioned below a cross-flow rotating catalyst packing frame which contains a catalyst 74 within a catalyst bag.

Referring now to FIG. 3, there is shown DKTU equipped with a cross-flow rotating catalyst frame or catalyst packing frame 92 which is being used in this embodiment in place of flow tube 52. This embodiment is similar to DKTU 10 as previously described with respect to vessel 12, reactant media 24, motor 34, and magnetic coupled gear reduction box 40. Thus, the overall environment herein provided is similar in nature to DKTU 10 as previously described. Frame support 90 is mounted and fixedly attached to vessel 12 for supporting catalyst packing frame 92 which is adapted to be rotated about shaft axis 38, as will be described.

Motor 34 is rotationally coupled through motor shaft 36 to magnetic coupled gear reduction box 40. Upper reaction shaft 94 is rotatably mounted within frame support 90 for rotation about shaft axis 38 and responsively to permit rotation of catalyst packing frame 92.

Catalyst packing frame 92 may be a box-like structure containing catalyst 74 which is contained within catalyst container 76. Catalyst container 76 may be a bag-like structure which is porous to allow flow of media 24 contained within vessel 12 to pass through catalyst container 76 and catalyst 74 upon rotation of catalyst packing frame 92. Lower reaction shaft 96 is fixed to a lower surface of catalyst packing frame 92 and rotated responsive to the rotation of catalyst packing frame 92 to permit cross-flow of media 24 through catalyst 74. Lower reaction shaft 96 is respectively attached on opposing ends to catalyst packing frame 92 and impeller 98, as is seen. Impeller 98 may be one of a well-known type of impeller contours and substantially may be a propeller contour for aiding in the mixing of media 24 within vessel 12.

Thus, actuation of motor 34 causes a responsive rotation of motor shaft 36 and a responsive rotation of upper rotation shaft 94 which is fixedly secured to an upper surface of catalyst packing frame 92. As upper reaction shaft 94 is rotated, catalyst packing frame 92 is further rotationally driven which in turn rotationally drives lower catalyst shaft 96 and impeller 98.

This then permits a cross-flow of media 24 through catalyst 74 contained within catalyst packing frame 92. As was previously detailed for DKTU 10, reactant feed conduit 22 is provided and inserts reactant media 24 into vessel 12. DKTU 10' also provides for vapor reaction media outlet conduit 20 for transmitting vapor products and sampling of the vapor within vessel 12. Vapor reaction media outlet conduit 20 passes through an upper wall 30 of vessel 12 to a position above reactant media upper surface 26. Liquid reaction media outlet conduit 18 permits egress of liquid products of the reacted media 24 to pass external vessel 12. Liquid reaction media outlet conduit 18 similar to vapor reaction media outlet conduit 20 passes through vessel upper wall 30 and extends below media upper surface 26 within vessel 12 for liquid product transmission and sampling.

The use of a single catalyst container bag 76 as depicted in FIG. 3 produces varying cross-flow velocities in a radial direction with respect to shaft axis 38 across container bag 76.

Figure 4:
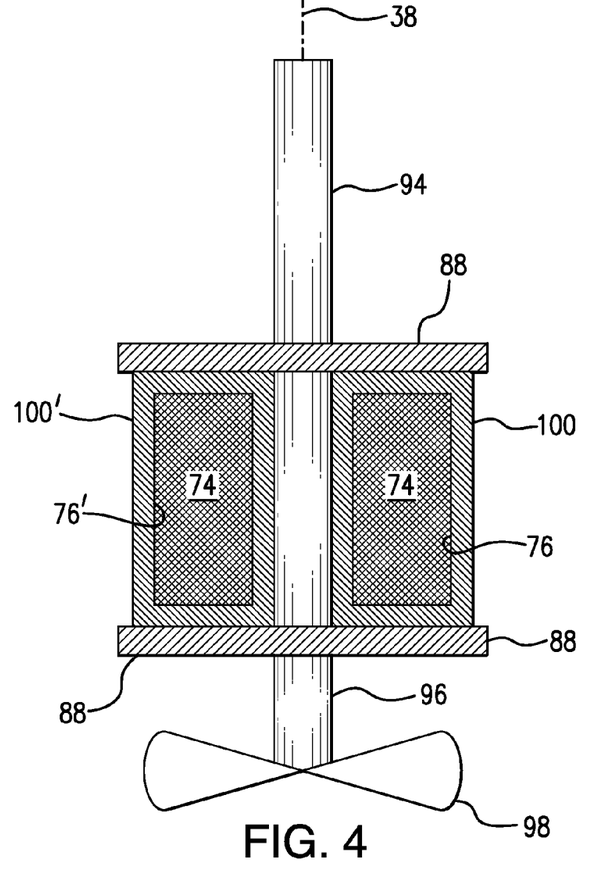
FIG. 4 is directed to a further embodiment of the subject concept where a pair of catalyst packing frame are mounted on opposing sides of a reaction shaft.
Figure 4A:
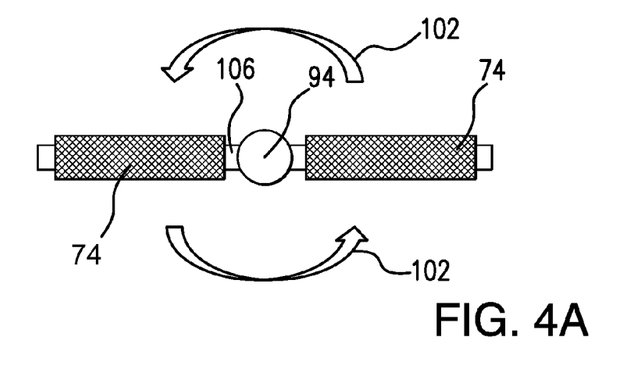
FIG. 4A is a schematic section of the embodiment shown in FIG. 4 showing rotation of the catalyst packing frames about a rotational axis of the reaction shaft.

Referring now to FIG. 4, there is shown a variation of DKTU 10' provided in FIG. 3 where DKTU 10' has a similar rotational drive. FIG. 4 only depicts rotating catalyst frame 88 within which is mounted a pair of catalyst frame containers 100 and 100' in side-by-side relation. Each of catalyst frame containers 100, 100' contains respective catalyst containers 76 and 76'. Catalyst 74 is contained within catalyst containers 76, 76' in the same manner as that which was provided for DKTU 10' as shown in FIG. 3. In this embodiment, catalyst 74 is contained within catalyst container 76, 76' which are rotated in response to rotation of upper reaction shaft 94 in the direction as depicted in FIG. 4A. The rotational direction is depicted by the rotational arrows 102 for passage of media 24 through catalyst 74 in each of containers 76, 76'.

Responsive to the rotation of rotating catalyst frame 88, there is a cross-flow of media 24 through catalyst 74 in each of containers 76, 76'. As catalyst frame 88 rotates in direction 102 at a predetermined revolutions per minute, cross-flow velocity is induced through containers 76, 76', which produces a non-varying cross-flow velocity in a radial direction with respect to shaft axis 38. In the embodiment shown for DKTU 10', cross-flow across catalyst 74 provides an effective cross-flow providing kinetic parameters with low mass transfer resistances external to catalyst 74 within the catalyst containing bags or catalyst containers 76, 76'.

Figure 5:
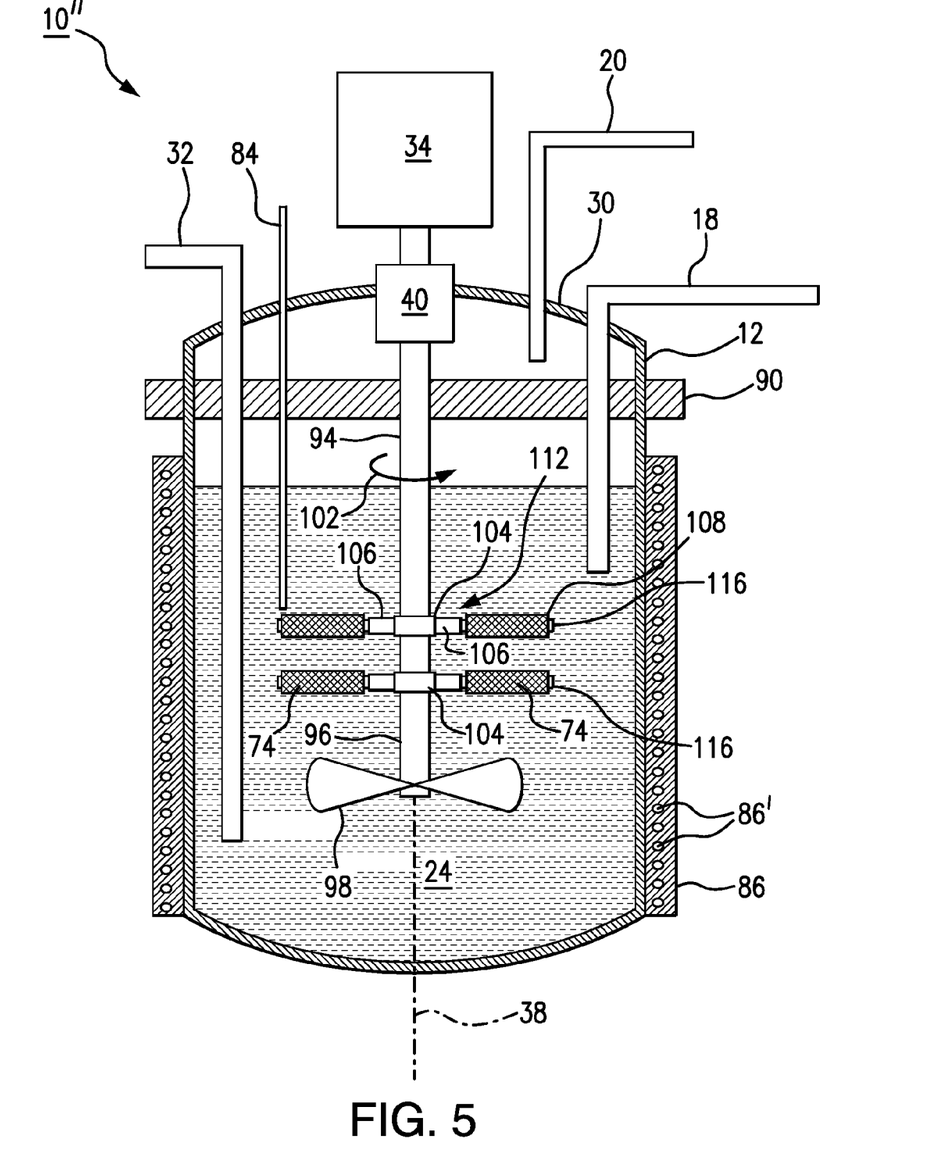
FIG. 5 is a further embodiment of the subject concept showing a DKTU equipped with a parallel flow rotating catalyst frame utilizing a plurality of catalyst frames.
Figure 6:
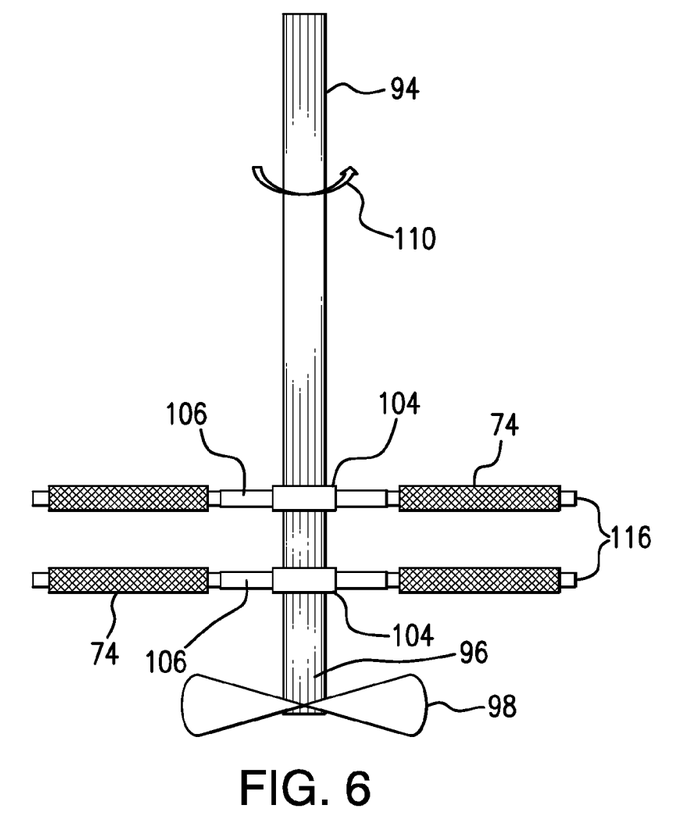
FIG. 6 is a schematic portion of a portion of the DKTU unit shown in FIG. 5 providing for a frame holding catalyst packing attached to the reaction shaft for rotational motion.
Figure 7:
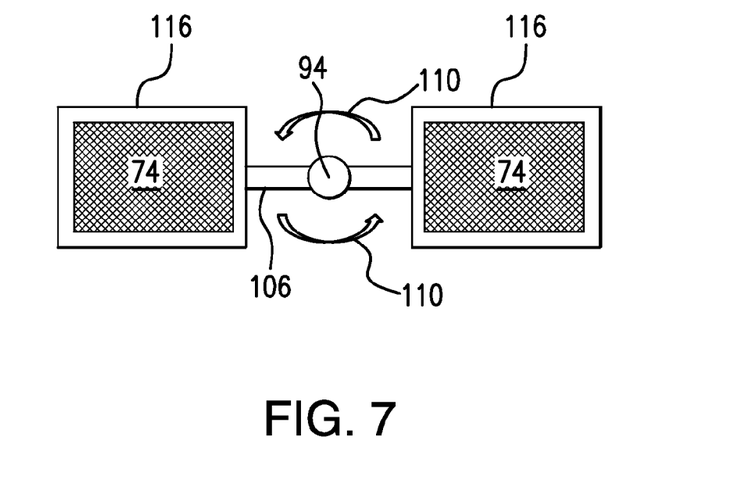
FIG. 7 is a schematic portion of the embodiment shown in FIG. 6 showing the rotation of the coupled catalyst bags about the reaction shaft rotational axis.

Referring now to FIGS. 5-7, there is shown DKTU 10" defining a parallel flow rotating catalyst frame embodiment. As was seen in the description of DKTU 10', the basic structural considerations associated with the vessel 12 and frame support 90 are similar in nature to DKTU 10' and will not be further described. In this embodiment, catalyst mounting frame 112 consists of a pair of catalyst support members 106 which are fixedly secured to opposing catalyst frames 116 within which are located catalysts 74. Catalyst supports 106 extend from upper reaction shaft 94 in a radial direction with respect to axis 38. Catalyst support members 106 are coupled on opposing ends to catalyst frame 116 and upper reaction shaft 94, as is seen in FIGS. 6 and 7. Coupling may be effected through threaded mountings, or some like technique, not important to the subject concept. Catalyst frames 116 may take the form of a rectangular contour, as is seen in FIG. 7, however, such contour is not important to the inventive concept of the subject Application. The important thing is that containers containing the catalysts 74 are to be mounted in a substantially horizontal direction in order to permit a parallel configuration. Such system represents a prototype parallel flow in reactive distillation equipped with a structure catalyst packing with down flow of liquid phase and up flow of vapor phase. By adjustment of motor 34 speed, the relative velocity of fluid and catalyst bags or containers is simulated representing flow conditions in a reactive distillation process.

Rotation of impeller 98 provides for backward flow of reactant media 24 through catalyst 74 to provide parallel flow configuration as described.

By comparing the kinetic parameters from DKTU 10' and DKTU 10", there is seen the significance of external mass transfer resistance, thereby minimizing the uncertainty of applying the kinetic parameters to catalyst packings which can be further validated by testing using DKTU 10'.

An operating procedure for testing consists of loading the vessel 12 with reaction fluid 24 or a fluid mixture. Reaction media is heated through use of electrical jacket heaters 86. Motor 34 may be operated at high speed during the heating period for thorough mixing of reaction media 24. When reaction media 24 reaches a predetermined temperature measured by temperature sensor 84, motor speed may then be set to a predetermined level for a predetermined flow velocity across the catalysts 74. Test runs may be continued for some predetermined time based on a particular chemical analysis of reacting fluid. Fluid samples may be removed through liquid and vapor sampling conduits 18 and 20 being taken from the bulk of the reaction media 24. DKTU 10' and 10" may be operated in either a batch mode or a continuous stirred-tank reactor procedure by feeding fresh reaction media 24 through reactant feed conduit 22 and taking liquid and vapor products.

DKTU 10, 10', and 10" are particularly important for the scaling of batch kinetic parameters of complex multi-step, reversible, and often equilibrium-limiting chemical reactions. In one such example in which esterification of citric acid takes place in three reversible reaction steps, accurate determination of kinetic parameters (including the energy of activation) for each step is important for designing commercial RD processes based on batch kinetic parameters. DKTU units 10, 10', and 10" generate batch kinetic parameters for such complex reactions under prototype process conditions. The esterification of citric acid is seen in the following Table 1.

TABLE 1

Kinetic parameters obtained from DKTU 10, 10', and 10" may be used for developing a rate-based Fortran or C++ performance prediction models of side reactors of reactive distillation, as well as conventional RD. In such models, the local rate of reaction is based on local fluid dynamics and process conditions. It is also possible to account for localized heat and mass transfer processes. The resulting Fortran or C++ performance models are applicable to reactive distillation with catalysts loaded in the column as well as side reactors of reactive distillation. Through direct application of kinetic parameters, the uncertainties of scaling the batch reaction parameters to flow reactors is significantly reduced. Such performance models may be incorporated into the process simulation model and this is an important step in designing reactive distillation for complex reactions, as such as that described above with minimum design uncertainties.

Figure 8:
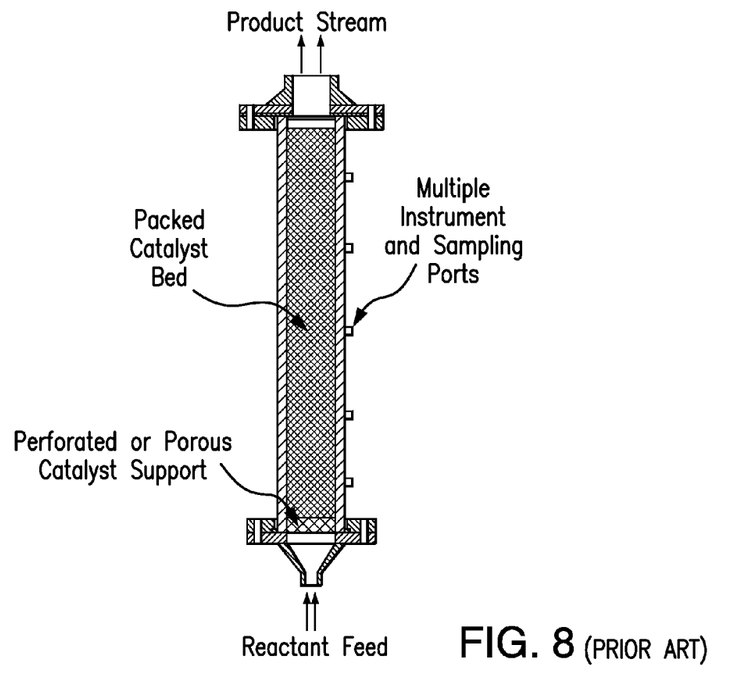
FIG. 8 is a schematic view of the prior art plug flow reactor with catalysts being packed in a high pressure vessel.
Figure 10:
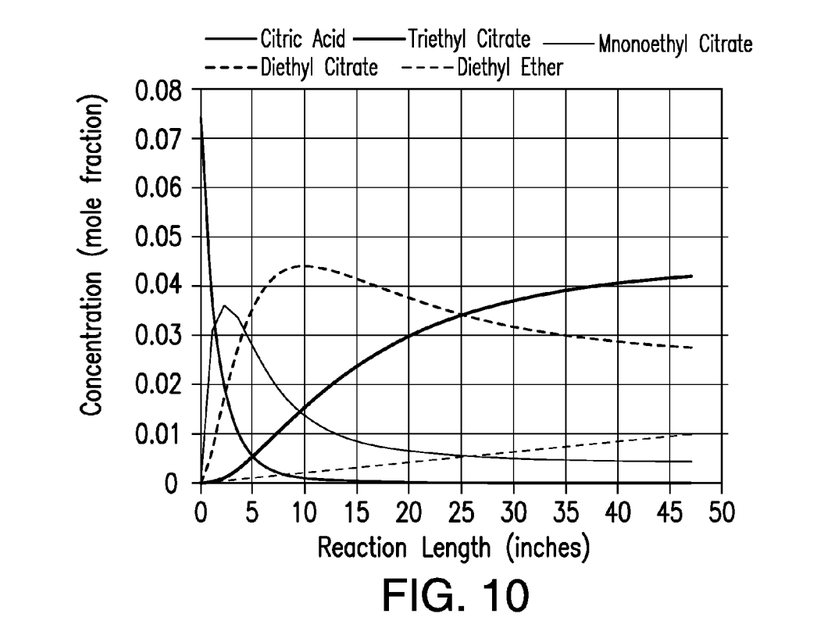
FIG. 10 is a graphical view of predicted concentration profiles by a Fortran-based performance model in a laboratory pilot-scale test unit; and, FIG. 11 is a graphical representation of concentration profiles by Fortran-based performance models for a commercial scale plug-flow reactor.

The value of DKTU 10, 10', and 10" can be illustrated for the reaction mechanism for synthesis of triethyl citrate using citric acid and ethanol as reactants in the presence of heterogeneous catalysts in a plug-flow reactor. A typical plug-flow reactor (prior art) is depicted in FIG. 8 and original kinetic data is obtained by using a stirred reactor. Catalysts in a free floating mode and reactants are mixed in glass or metallic stirred laboratory-scale chemical reactors. Catalysts are stirred using a mechanical motor operated stirring device. Major uncertainties of applying the kinetic parameters obtained with relatively small stirred laboratory reactors to plug-flow reactors where catalysts are packed in a vessel are illustrated in FIG. 10. Scaling parameters include catalysts loading expressed as the mass of the catalysts per unit volume of reacting fluid and porosity of the catalyst bed of the plug-flow reactor. Generally, an arbitrary parameter of catalyst effectiveness may be used for applying the kinetic parameters obtained with stirred reactor to plug-flow reactors. By simulating the flow conditions and catalysts packed in a prototype manner of the plug-flow reactor, the kinetic parameters obtained with the DKTU 10, 10', 10" may be directly applied to simulated plug-flow reactors.

Table 2 below depicts process parameters of a commercial unit and laboratory pilot plant with this Table presenting the level of scale up that the subject system directs itself. The flow rate of reactant feed in the pilot plant may approximate 2.43 kg/hr, while that in the commercial unit may be on the order of 2,000 kg/hr. This represents a scale-up on the order of 1,000.

TABLE 2

| Process Parameter | Commercial Unit | Pilot Plant | Units |
|---|---|---|---|
| Process Conditions | | | |
| Production Capacity of Triethyl Citrate | 8,000 | | metric tons/year |
| Reactant Feed Rate | 2,092 | 2.43 | kg/hr |
| Temperature | 110 | 105 | ° C. |
| Pressure | 2.5 | 2.5 | atmosphere |
| Conversion of Reaction | 78% | 65% | |
| Reactor Dimensions | | | |
| Diameter | 1,100 | 49.30 | milimeter |
| Length | 4.70 | 0.76 | meter |

Figure 9:
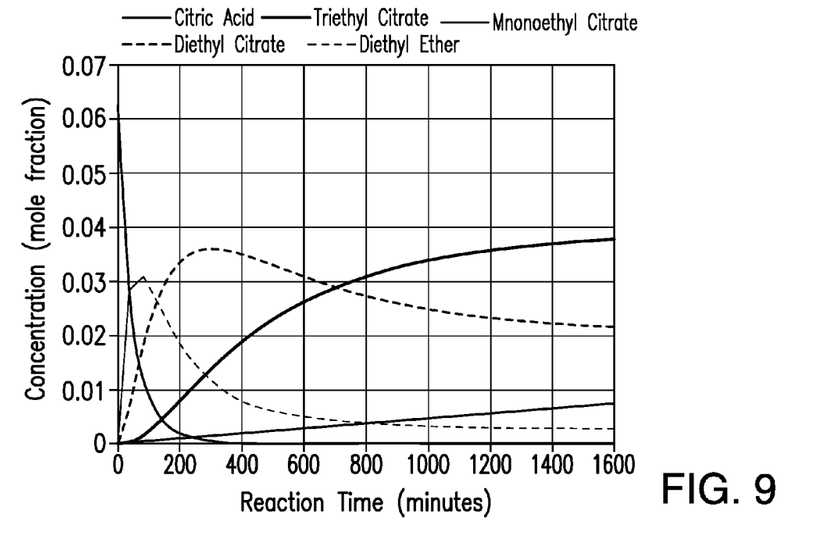
FIG. 9 is a graphical representation of concentration profiles of reactants and products for a model kinetic reaction test in a DKEU unit or similar batch reactor.
Figure 11:
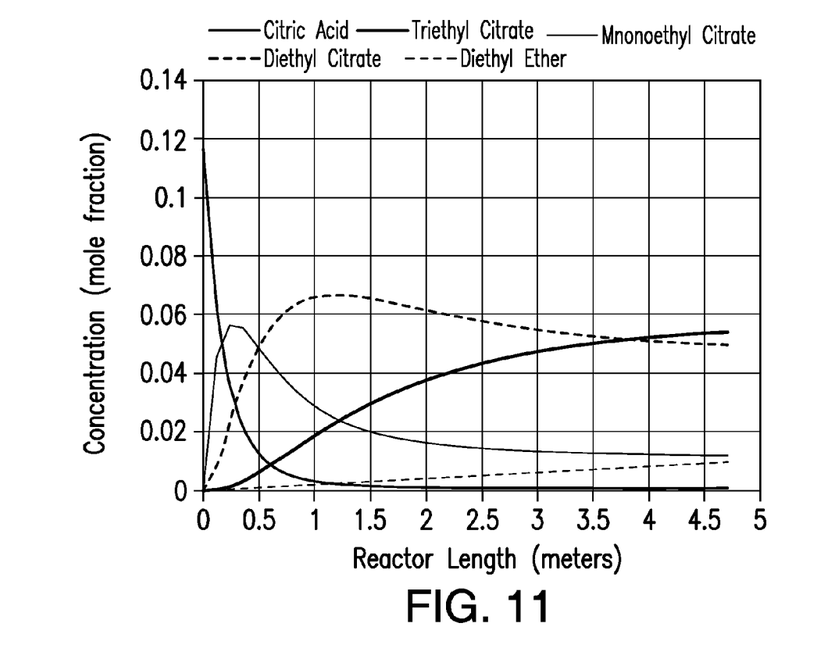

FIG. 9 shows typical concentration profiles of the batch reaction for synthesis of triethyl citrate that can be obtained by the DKTU 10, 10', 10" for a set of test conditions presented in Table 2. A kinetic model may be developed to match the test data and typically a Fortran or C++ program is developed for determining the kinetic parameters to match concentration profiles of the test data with predicted profiles as depicted in FIG. 9. The Fortran or C++ based kinetic model is then incorporated into a Fortran or C++ base performance model to predict the rate of reaction in a plug-flow reactor as shown in FIG. 10 for a pilot-scale test unit. Subsequently, such may be applied to a full scale commercial unit as depicted in FIG. 11 for design conditions presented in Table 2.

Although this invention has been described in connection with specific forms and embodiments thereof, it will be appreciated that various modifications other than those discussed above may be resorted to without departing from the spirit or scope of the invention as defined in the appended claims. For example, functionally equivalent elements may be substituted for those specifically shown and described, certain features may be used independently of other features, and in certain cases, particular locations of elements, steps, or processes may be reversed or interposed, all without departing from the spirit or scope of the invention as defined in the appended claims.

What is claimed is:

1. A differential kinetic test unit for determining chemical reaction parameters comprising:
   (a) a vessel for insert of reaction media through a reactant feed conduit;
   (b) a reaction outlet mechanism for removal of liquid and vapor reaction components;
   (c) a motor located external said vessel for rotating a motor shaft and a reaction shaft extending into said reaction media contained within said vessel;
   (d) a mixing impeller fixed to said reaction shaft, said mixing impeller being positioned within said reaction media;
   (e) a catalyst frame for positioning at least one catalyst container containing a catalyst, said catalyst container being at least partially immersed in said reaction media, said reaction media being drawn through said catalyst whereby reacted media is withdrawn through said reaction outlet mechanism for testing of said chemical reaction parameters; and
   (f) a vertically extending flow tube at least partially immersed in said reaction media, said catalyst frame being mounted to an inner wall of said flow tube, said flow tube including:
      (a1) an upper section having said mixing impeller positioned therein,
      (a2) a central section having said catalyst frame and said catalyst positioned therein, said central section having a reaction media flow cross-sectional area less than the reaction media flow-cross-sectional area of said flow tube upper section; and
      (a3) a lower section for insert of said reaction media into said flow tube responsive to rotation of said mixing impeller.

2. The DKTU as recited in claim 1 where said catalyst container is a porous wire screen member secured to said inner wall of said flow tube, said catalyst container being mounted on said wire screen member.

3. The DKTU as recited in claim 2 where said catalyst container is a mesh bag having porosity for passage of said reaction media through said catalyst frame, said mesh bag, and said catalyst responsive to rotation of said mixing impeller.

4. The DKTU as recited in claim 1 where said flow tube central section has a reaction media flow cross-sectional area less than the reaction media flow cross-sectional area of said flow tube lower section.

5. The DKTU as recited in claim 4 where said rotation of said mixing impeller results in a pressure drop between said flow tube upper section and said flow tube lower section for continuously driving said reaction media through said catalyst.

6. The DKTU as recited in claim 1 where said flow tube defines a reaction media flow channel having a substantially venturi contour where said catalyst frame is fixedly secured to said inner wall of said flow tube substantially at a throat section of said flow tube.

7. The DKTU as recited in claim 1 where said motor is positioned external said vessel and is magnetically coupled to said reaction shaft for driving said mixing impeller.

8. The DKTU as recited in claim 7 where said motor shaft is magnetically coupled to said reaction shaft through a magnetically actuated speed reduction gear mechanism.

9. The DKTU as recited in claim 1 where said reaction outlet mechanism Includes:
   (a) a liquid reaction media outlet conduit for removal of liquid reaction components from internal said vessel, said liquid outlet conduit extending from an exterior of said vessel to a position below an upper surface of said reaction media contained in said vessel; and,
   (b) a vapor reaction media outlet conduit for removal of vapor reaction components from internal said vessel, said vapor outlet conduit extending from an exterior of said vessel to a position above said upper surface of said reaction media contained in said vessel.

10. The DKTU as recited in claim 1 including at least one liquid sampling conduit extending from external said vessel through said inner wall of said flow tube to a positionally location above said catalyst frame for sampling reaction media subsequent to passage of said reaction media through said catalyst.

11. The DKTU as recited in claim 1 including a temperature sensor extending internal said vessel for determining the temperature of said reaction media.

12. The DKTU as recited in claim 1 including a thermal jacket surrounding at least a portion of an external wall surface of said vessel for heating said reaction media.

13. The DKTU as recited in claim 1 including a liquid sampling conduit extending into said reaction media for drawing out samples of said reaction media during operation.

14. A differential kinetic test unit for determining chemical reaction parameters comprising:
   (a) a vessel for insert of reaction media through a reactant feed conduit;
   (b) a reaction outlet mechanism for removal of liquid and vapor reaction components;
   (c) a motor located external said vessel for rotating a motor shaft and a reaction shaft extending into said reaction media contained within said vessel;
   (d) a mixing impeller fixed to said reaction shaft, said mixing impeller being positioned within said reaction media; and
   (e) a catalyst frame for positioning at least one catalyst container containing a catalyst, said catalyst container being at least partially immersed in said reaction media, said reaction media being drawn through said catalyst whereby reacted media is withdrawn through said reaction outlet mechanism for testing of said chemical reaction parameters, said catalyst frame being aligned co-axially with said reaction shaft and immersed within said reaction media for rotation of said catalyst frame about an axis of said reaction shaft.

15. The DKTU as recited in claim 14 where said reaction shaft includes:
   an upper reaction shaft section magnetically coupled to said motor; and
   a lower reaction shaft section fixedly attached to a lower member of said catalyst frame at a first end thereof and to said mixing impeller on a second end thereof.

16. The DKTU as recited in claim 14 where said mixing impeller is coupled to said catalyst frame for concurrent rotation of said catalyst frame and said mixing impeller.

17. The DKTU as recited in claim 15 where said mixing impeller is immersed in said reaction media and positioned below said catalyst frame for concurrent rotation of said upper reaction shaft section, said catalyst frame, said lower reaction shaft section and said mixing impeller.

18. The DKTU as recited in claim 14 where said mixing impeller is positionally located below said catalyst frame within said reaction media.

19. The DKTU as recited in claim 14 where said catalyst within said catalyst container is concurrently rotated with said catalyst frame about said axis of said reaction shaft.

20. The DKTU as recited in claim 14 where said catalyst container containing said catalyst is a porous container for permitting said reaction media to pass therethrough.

21. The DKTU as recited in claim 14 including:
   at least a first and second catalyst container mounted to said catalyst frame, said first and second catalyst containers being located substantially equidistant from said axis line of said reaction shaft in a transverse direction.

22. The DKTU as recited in claim 21 where said mixing impeller is immersed in said reaction media and positioned below said catalyst frame for concurrent rotation of said catalyst frame and said reaction shaft.

23. The DKTU as recited in claim 21 where said reaction shaft includes:
   an upper reaction shaft section magnetically coupled to said motor; and,
   a lower reaction shaft section fixedly attached to a lower member of said catalyst frame at a first end thereof and to said mixing impeller at a second end thereof.

24. The DKTU as recited in claim 21 where said mixing impeller is immersed in said reaction media and located below said catalyst frame for concurrent rotation of said upper reaction shaft rotation, said catalyst frame, said lower reaction shaft rotation and said mixing impeller.

25. A differential kinetic test unit for determining chemical reaction parameters comprising:
   (a) a vessel for insert of reaction media through a reactant feed conduit;
   (b) a reaction outlet mechanism for removal of liquid and vapor reaction components;
   (c) a motor located external said vessel for rotating a motor shaft and a reaction shaft extending into said reaction media contained within said vessel;
   (d) a mixing impeller fixed to said reaction shaft, said mixing impeller being positioned within said reaction media; and
   (e) a catalyst frame for positioning at least one catalyst container containing a catalyst, said catalyst frame including:
      (a1) at least one coupling member secured to said reaction shaft; and,
      (b1) at least a pair of catalyst support members extending from and fixedly connected to said coupling member on opposing sides of said reaction shaft,
   said catalyst container being at least partially immersed in said reaction media, said reaction media being drawn through said catalyst whereby reacted media is withdrawn through said reaction outlet mechanism for testing of said chemical reaction parameters.

26. The DKTU as recited in claim 25 including at least two catalyst containers fixed to each of said catalyst support members.

27. The DKTU as recited in claim 26 where said at least two catalyst containers are positionally mounted on said pair of catalyst support members substantially equidistant from a rotation axis of said reaction shaft.

28. The DKTU as recited in claim 25 where said catalyst container is a porous mesh bag.

29. The DKTU as recited in claim 26 where said mixing impeller is coupled to said reaction shaft below said at least two catalyst containers.

* * * * *